United States Patent [19]
Maeda

[11] 4,206,975
[45] Jun. 10, 1980

[54] RETROFOCUS TYPE WIDE-ANGLE LENS SYSTEM

[75] Inventor: Haruo Maeda, Hino, Japan

[73] Assignee: Olympus Optical Co., Ltd., Tokyo, Japan

[21] Appl. No.: 944,655

[22] Filed: Sep. 21, 1978

[30] Foreign Application Priority Data

Sep. 27, 1977 [JP] Japan .................. 52-115706

[51] Int. Cl.² ........................................... G02B 11/32
[52] U.S. Cl. ................................................ 350/215
[58] Field of Search ........................... 350/215, 214

[56] References Cited

U.S. PATENT DOCUMENTS

| | | | |
|---|---|---|---|
| 3,551,030 | 12/1970 | Gilkeson et al. | 350/215 |
| 3,731,989 | 5/1973 | Shimizu | 350/216 |
| 3,936,153 | 2/1976 | Ogura | 350/216 |

FOREIGN PATENT DOCUMENTS

49-49623  5/1974 Japan.
50-138824 11/1975 Japan.
51-13573  4/1976 Japan.

*Primary Examiner*—Conrad J. Clark
*Attorney, Agent, or Firm*—Cushman, Darby & Cushman

[57] ABSTRACT

A retrofocus type wide-angle lens system for use in micro readers, micro printers, facsimiles, etc. comprising a first negative meniscus lens component, a second positive lens component, a third biconcave lens component, a fourth positive lens component, a fifth positive lens component and a sixth negative meniscus lens component. Said lens system assures high resolution even at marginal portions of image and has a high aperture efficiency.

6 Claims, 11 Drawing Figures

RETROFOCUS TYPE WIDE-ANGLE LENS SYSTEM

BACKGROUND OF THE INVENTION (a) Field of the Invention

The present invention relates to a retrofocus type wide-angle lens system to be used in micro readers, micro printers, facsimiles, etc.

(b) Description of the Prior Art

Lens systems to be used in micro readers, micro printers, facsimiles, etc. must be so designed as to afford an aperture efficiency of 100% for assuring uniform intensity of illumination over the entire range of image. However, all the conventionally known retrofocus type lens systems comprising six lens components of six elements are designed as those for photographic cameras and, therefore, have aperture efficiencies on the order of 40%~60%. There are available no retrofucus type lens systems which are designed for an aperture ratio of F/2.8, field angle on the order of 63° and an aperture efficiency of 100%. Further, from the viewpoint of correction of aberrations, lens systems for photographic cameras are different from those for micro reader, micro printer, facsimile, etc. since the former lens systems are designed for correction of aberrations for photographing object placed at indefinite distance, whereas the latter systems are designed for photographing object at finite distance.

SUMMARY OF THE INVENTION

A general object of the present invention is to provide a lens system for micro readers, micro printers, facsimiles, etc. which has an aperture ratio of F/2.8 and a field angle on the order of 63° and in which aberrations are favorably corrected over the entire range of image.

High resolution, high aperture efficiency and minimum distortion are required for such a lens system to be used with micro readers, micro printers, facsimile, etc. as is provided by the present invention. The lens system according to the present invention is so designed as to satisfy also these requirements.

Further, it is necessary to avoid shortening back focal length, to prevent operability of the lens system from being degraded when it is designed for a wide field angle. The lens system according to the present invention is so designed as to have a wide field angle in combination with a back focal length $f_B$ which is not so short.

Further, when a lens system is designed for an aperture efficiency of 100%, the pencil passing through said lens system has a large diameter and, therefore, it becomes necessary to correct coma over a wide range. The lens system according to the present invention is so adapted as to additionally satisfy this requirement.

The lens system according to the present invention is a retrofocus type wide-angle system comprising six components of six elements, i.e, a front lens group consisting of a first negative meniscus lens component having a convex surface on the object side and a second positive lens component, and a rear lens group consisting of a third biconcave lens component, a fourth positive lens component, a fifth positive lens component and a sixth negative meniscus lens component having a concave surface on the image side. Said lens system is so designed as to satisfy the following conditions:

(1) $-3.5f \leq f_1 \leq -1.2f$
(2) $0.85 \leq r_8/r_5 \leq 1.25$
(3) $0.06f \leq d_5 + d_6 \leq 0.12f$
(4) $0.12f \leq d_6 + d_7 \leq 0.24f$ wherein the reference symbols represent as defined below:

f: focal length of the entire lens system as a whole
$f_1$: focal length of the first lens component
$r_5$: radius of curvature on the object side surface of the third lens component
$r_8$: radius of curvature on the image side surface of the fourth lens component
$d_5$ and $d_7$: thicknesses of the third and fourth lens components
$d_6$: airspace between the third and fourth lens components Now, significance of the above-mentioned conditions will be described consecutively. The lens system according to the present invention is designed as the retrofocus type by arranging a negative meniscus lens as the first component for obtaining a long back focal length $f_B$. If this first lens component has too strong power, it is disadvantageous to favorably correct spherical aberration and obtain preferable sine condition. The condition (1) has been defined taking this point into consideration. If, in condition (1), the focal length $f_1$ of the first lens component is smaller than the lower limit of $-3.5f$, the first lens component will have weak power, thereby making it impossible to obtain a long back focal length $f_B$. If $f_1$ is larger than the upper limit of $-1.2f$, the first lens component will have strong power, thereby increasing spherical aberration and sine condition in the positive direction.

The condition (2) is required for correcting coma produced by the front lens group and asymmetry thereof by the rear lens group. In $r_8/r_5$ is smaller than the lower limit of 0.85 defined by the condition (2), coma will be unbalanced and image performance for offaxial rays will be degraded. If $r_8/r_5$ exceeds the upper limit of 1.25, in contrast, spherical aberration will be undercorrected.

In order to obtain high resolution even at marginal portions of image which is necessary for a lens system to be used with micro readers, micro printers, facsimile, etc., an image plane must be free from curvature and at the same time distortion must be minimum. The conditions (3) and (4) are adopted for satisfying these requirements. If $d_5 + d_6$ is smaller than the lower limit of 0.06f defined by the condition (3), the meridional image plane will be curved remarkably on the negative side. If $d_5 + d_6$ exceeds the upper limit of 0.12f, in contrast, spherical aberration will be undercorrected and, in addition, coma will be aggravated, thereby aggravating aberrations for both the paraxial and offaxial rays. If $d_6 + d_7$ is smaller than the lower limit of 0.12f defined by the condition (4), the offaxial image plane will be curved remarkably on the negative side. If $d_6 + d_7$ exceeds the upper limit of 0.24f, in contrast, spherical aberration will be undercorrected and, in addition, remarkable negative distortion will be produced.

Furthermore, the lens system according to the present invention is so adapted as to prevent eclipse at marginal portions of image, which is a defect in micro readers, micro printers, facsimile, etc., by imparting large diameters to the first and sixth lens components, thereby assuring an aperture efficiency of 100%.

DETAILED DESCRIPTION OF THE PREFERRED EMBODIMENTS

Now, some preferred embodiments of the present invention will be described detailedly with reference to the accompanying drawings.

Embodiment 1

$f = 1$       F/2.8       $\beta = -0.112X$ $r_0 = \infty$ $d_0 = 0.3173$, $n_0 = 1.52287$, $\nu_0 = 59.9$ $r_0' = \infty$ $d_0' = 8.7347$ $r_1 = 2.4516$ $d_1 = 0.1695$, $n_1 = 1.51633$, $\nu_1 = 64.15$ $r_2 = 0.8349$ $d_2 = 0.4442$ $r_3 = 0.7325$ $d_3 = 0.2530$, $n_2 = 1.72000$, $\nu_2 = 43.7$ $r_4 = -3.7637$ $d_4 = 0.1461$ $r_5 = -0.4965$ $d_5 = 0.0534$, $n_3 = 1.74077$, $\nu_3 = 27.79$ $r_6 = 1.6977$ $d_6 = 0.0284$ $r_7 = -3.1462$ $d_7 = 0.1536$, $n_4 = 1.75500$, $\nu_4 = 52.33$ $r_8 = -0.5251$ $d_8 = 0.0326$ $r_9 = 4.7802$ $d_9 = 0.1144$, $n_5 = 1.75500$, $\nu_5 = 52.33$ $r_{10} = -1.5031$ $d_{10} = 0.0776$ $r_{11} = 1.9016$ $d_{11} = 0.0868$, $n_6 = 1.53172$, $\nu_6 = 48.9$ $r_{12} = 1.2542$ $d_{12} = 0.8849$ $r_{13} = \infty$ $d_{13} = 0.0668$, $n_7 = 1.51633$, $\nu_7 = 64.15$ $r_{14} = \infty$ $r_8/r_5 = 1.0576$       $d_5 + d_6 = 0.0818$
$d_6 + d_7 = 0.182$       $f_1 = -2.543$ Embodiment 2

$f = 1$       F/2.8       $\beta = -0.112X$ $r_1 = 1.7842$ $d_1 = 0.1688$, $n_1 = 1.51633$, $\nu_1 = 64.15$ $r_2 = 0.5967$ $d_2 = 0.4389$ $r_3 = 0.7535$ $d_3 = 0.2534$, $n_2 = 1.72000$, $\nu_2 = 43.7$ $r_4 = -2.5440$ $d_4 = 0.1578$ $r_5 = -0.5200$ $d_5 = 0.0537$, $n_3 = 1.74077$, $\nu_3 = 27.79$ $r_6 = 1.5175$ $d_6 = 0.0292$ $r_7 = -6.0605$ $d_7 = 0.1405$, $n_4 = 1.75500$, $\nu_4 = 52.33$ $r_8 = -0.5356$ $d_8 = 0.0335$ $r_9 = -6.7837$ $d_9 = 0.1153$, $n_5 = 1.75500$, $\nu_5 = 52.33$ $r_{10} = -1.2390$ $d_{10} = 0.0798$ $r_{11} = 1.8230$ $d_{11} = 0.0944$, $n_6 = 1.77250$, $\nu_6 = 49.6$ $r_{12} = 1.6576$ $r_8/r_5 = 1.03$       $d_5 + d_6 = 0.0829$
$d_6 + d_7 = 0.1697$       $f_1 = -2.379$ Embodiment 3

$f = 1$       F/2.8       $\beta = -0.112X$ $r_1 = 1.8926$ $d_1 = 0.1693$, $n_1 = 1.51633$, $\nu_1 = 64.15$ $r_2 = 0.7632$ $d_2 = 0.4423$ $r_3 = 0.7420$ $d_3 = 0.2531$, $n_2 = 1.72000$, $\nu_2 = 43.7$ $r_4 = -3.7573$ $d_4 = 0.1484$ $r_5 = -0.4938$ $d_5 = 0.0537$, $n_3 = 1.74077$, $\nu_3 = 27.79$ $r_6 = 1.7639$ $d_6 = 0.0288$ $r_7 = -3.1687$ $d_7 = 0.1399$, $n_4 = 1.75500$, $\nu_4 = 52.33$ $r_8 = -0.5128$ $d_8 = 0.0330$ $r_9 = 9.9423$ $d_9 = 0.1146$, $n_5 = 1.75500$, $\nu_5 = 52.33$ $r_{10} = -1.4353$ $d_{10} = 0.0775$ $r_{11} = 2.3422$ $d_{11} = 0.0855$, $n_6 = 1.53172$, $\nu_6 = 48.9$ $r_{12} = 1.7397$ $d_{12} = 0.8968$ $r_{13} = \infty$ $d_{13} = 0.0425$, $n_7 = 1.51633$, $\nu_7 = 64.15$ $r_{14} = \infty$ $r_8/r_5 = 1.0385$       $d_5 + d_6 = 0.0825$
$d_6 + d_7 = 0.1687$       $f_1 = -2.532$ Embodiment 4

$f = 1$       F/2.8       $\beta = -0.112X$ $r_1 = 2.4578$ $d_1 = 0.1697$, $n_1 = 1.51633$, $\nu_1 = 64.15$ $r_2 = 0.8333$ $d_2 = 0.4441$ $r_3 = 0.7328$ $d_3 = 0.2532$, $n_2 = 1.72000$, $\nu_2 = 43.7$ $r_4 = -3.7826$ $d_4 = 0.1466$ $r_5 = -0.4970$ $d_5 = 0.0536$, $n_3 = 1.74077$, $\nu_3 = 27.79$ $r_6 = 1.6987$ $d_6 = 0.0288$ $r_7 = -3.1388$ $d_7 = 0.1540$, $n_4 = 1.75500$, $\nu_4 = 52.33$ $r_8 = -0.5253$ $d_8 = 0.0329$ $r_9 = 4.8094$ $d_9 = 0.1143$, $n_5 = 1.75500$, $\nu_5 = 52.33$ $r_{10} = -1.4993$ -continued

Embodiment 4

| f = 1 | | F/2.8 | | $\beta = -0.112X$ |
|---|---|---|---|---|
| | $d_{10} = 0.0774$ | | | |
| $r_{11} = 1.8969$ | | | | |
| | $d_{11} = 0.0869$ | $n_6 = 1.53172$ | $\nu_6 = 48.9$ | |
| $r_{12} = 1.2516$ | | | | |
| | $d_{12} = 0.9028$ | | | |
| $r_{13} = \infty$ | | | | |
| | $d_{13} = 0.0426$ | $n_7 = 1.51633$ | $\nu_7 = 64.15$ | |
| $r_{14} = \infty$ | | | | |
| $r_8/r_5 = 1.0569$ | | $d_5 + d_6 = 0.0824$ | | |
| $d_6 + d_7 = 0.1828$ | | $f_1 = -2.610$ | | |

Embodiment 5

Figure 1:
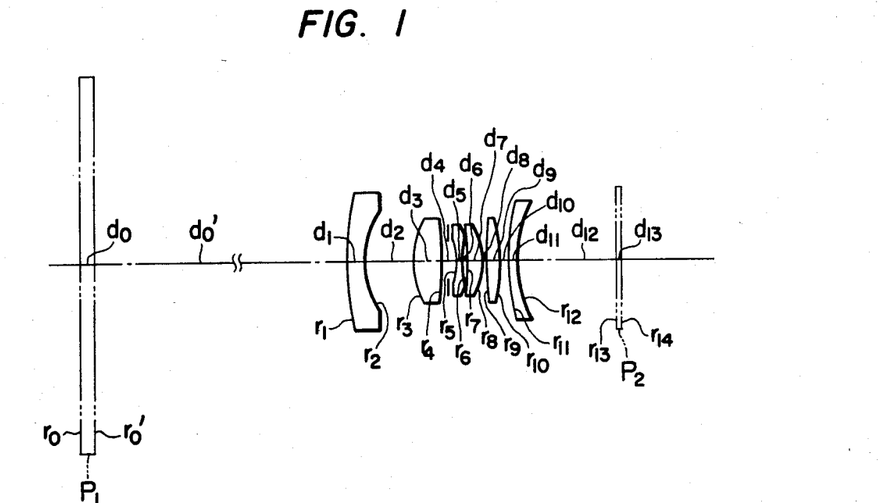
FIG. 1 shows a sectional view illustrating the composition of the lens system according to the present invention.
Figure 2A:
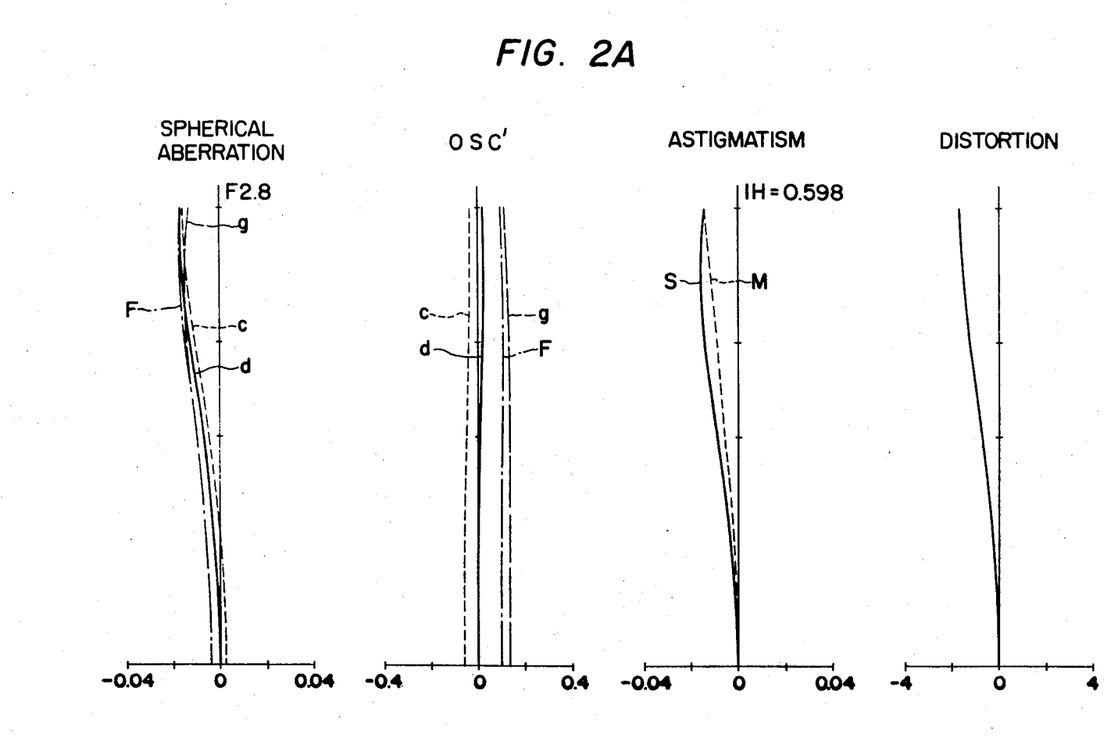
FIG. 2A and FIG. 2B show curves visualizing the aberration characteristics of the Embodiment 1 of the present invention.
Figure 2B:
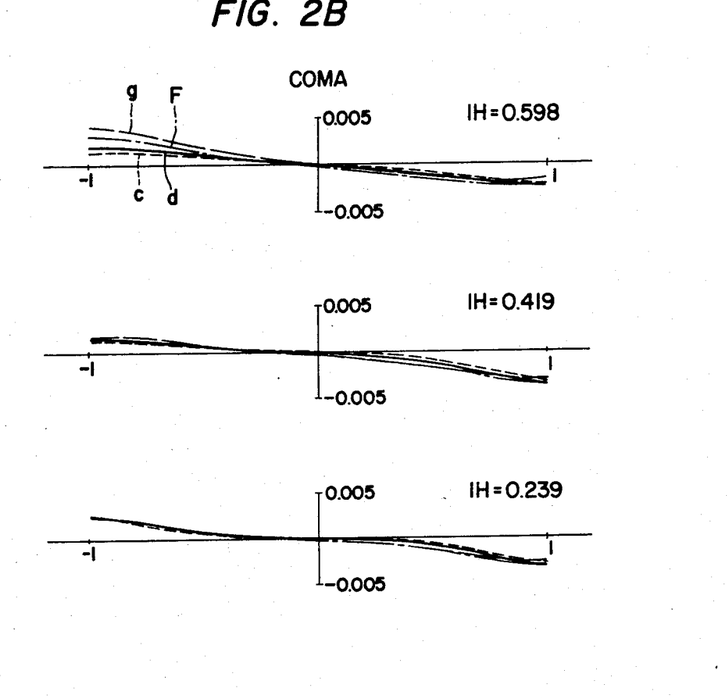
Figure 3A:
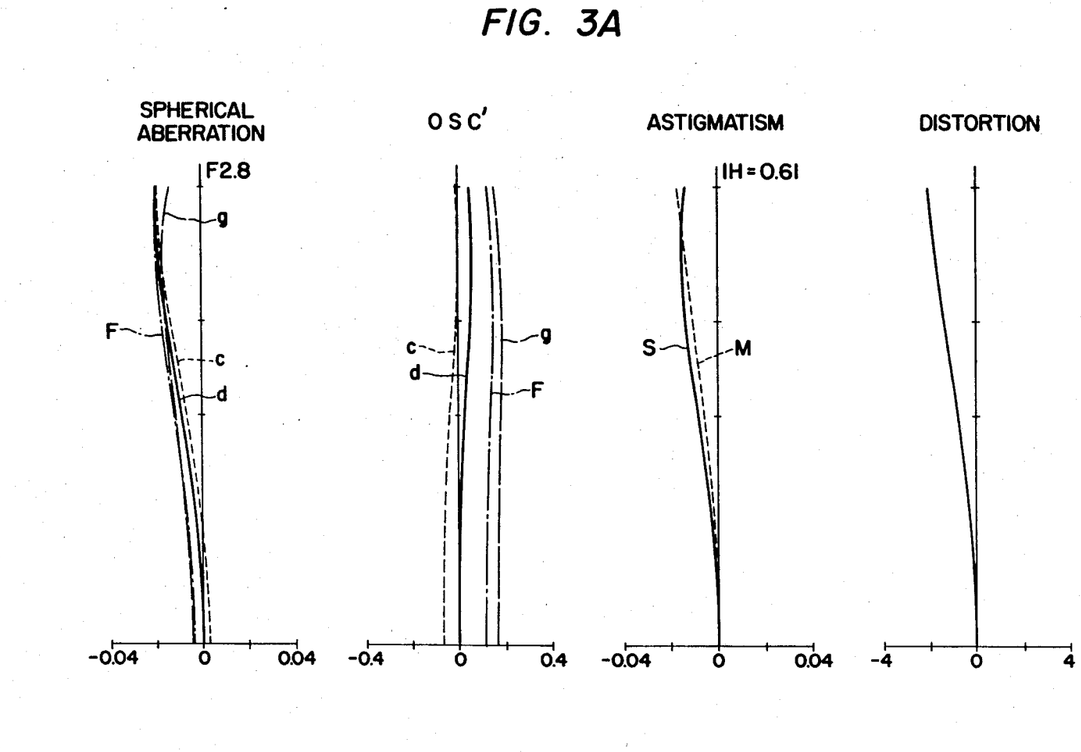
FIG. 3A and FIG. 3B show graphs illustrating the aberration characteristics of the Embodiment 2 of the present invention.
Figure 3B:
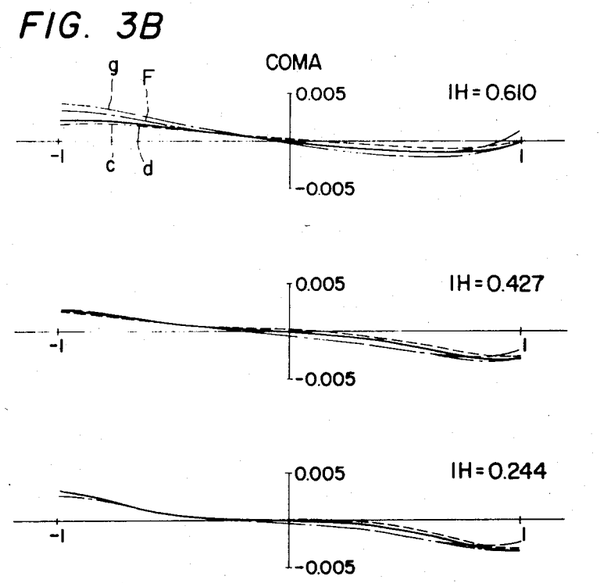
Figure 4A:
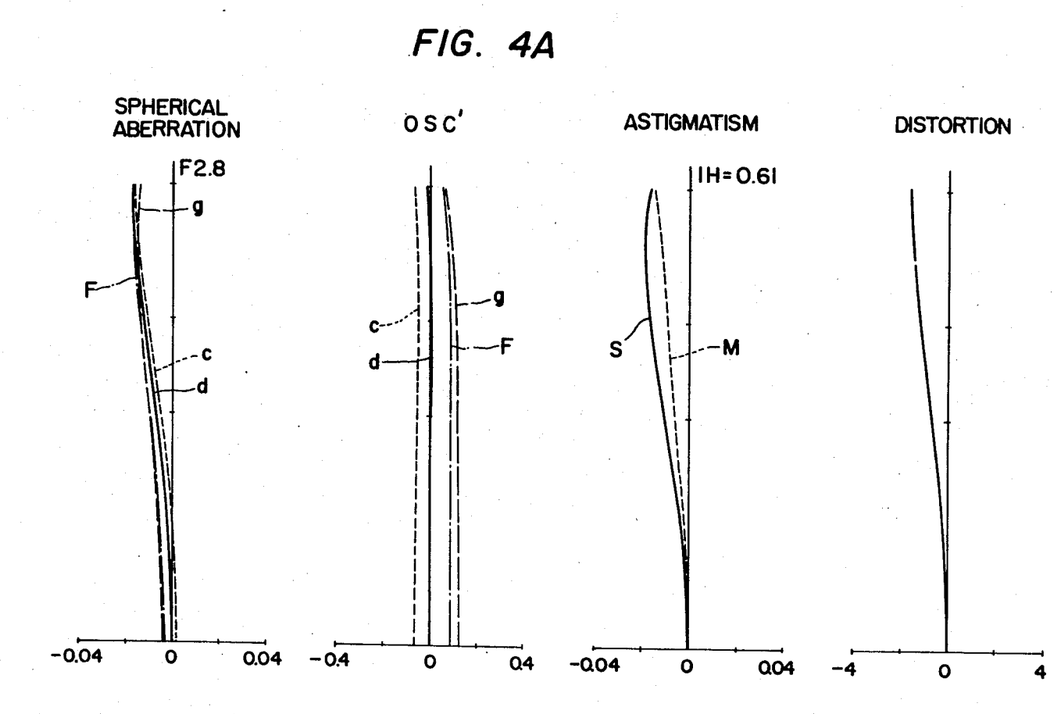
FIG. 4A and FIG. 4B illustrate graphs visualizing the aberration characteristics of the Embodiment 3 of the present invention.
Figure 4B:
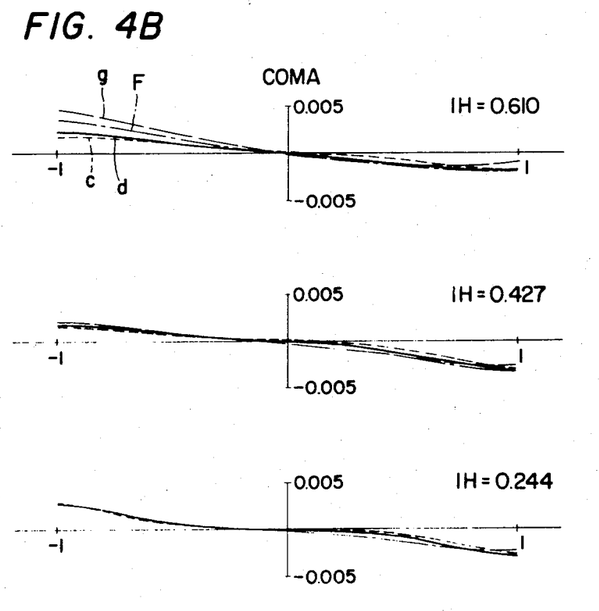
Figure 5A:
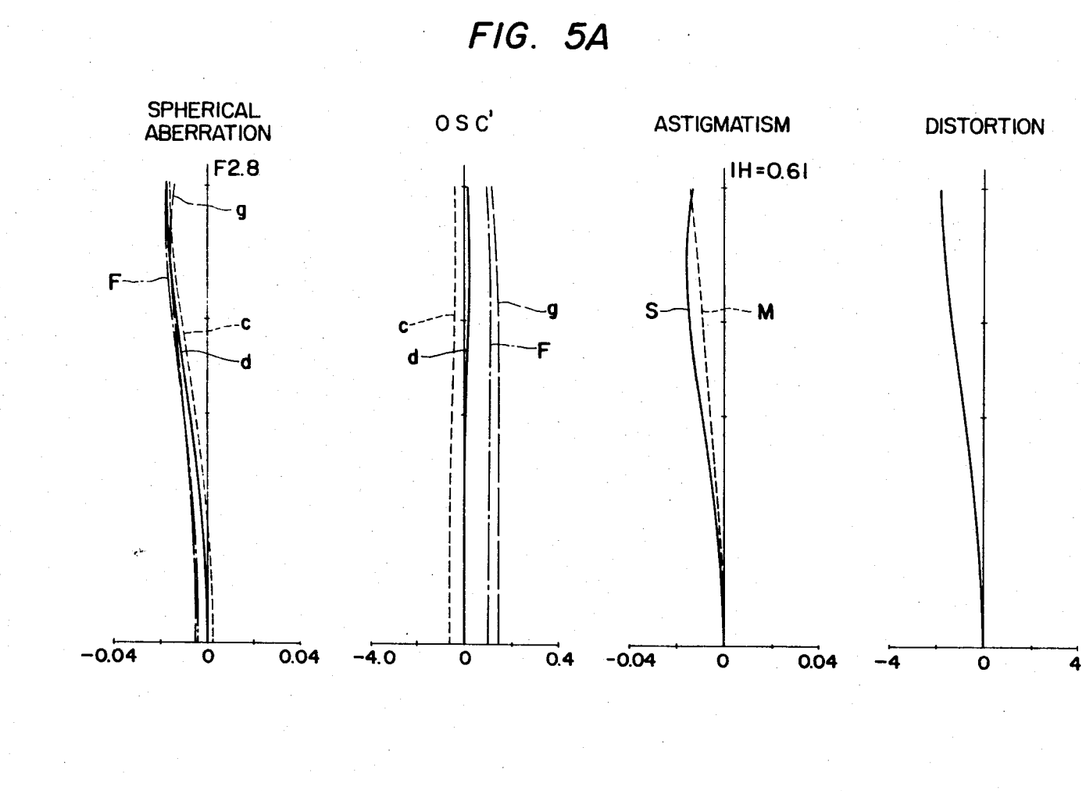
FIG. 5A and FIG. 5B illustrates curves visualizing the aberration characteristics of the Embodiment 4 of the present invention.
Figure 5B:
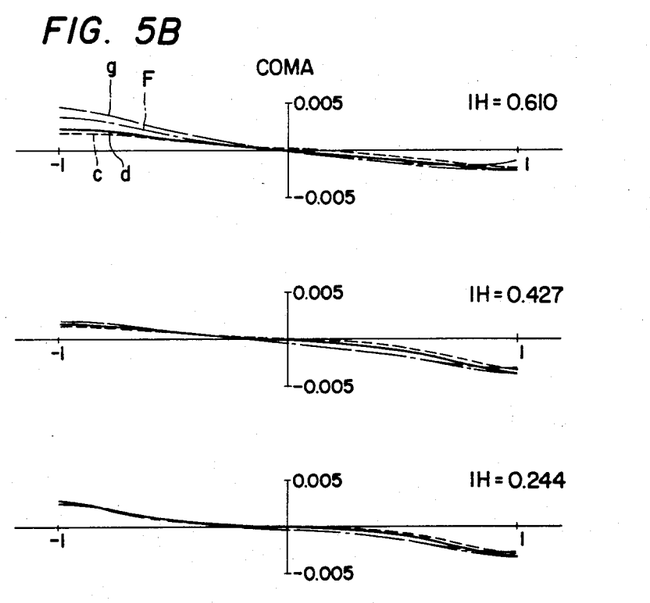
Figure 6A:
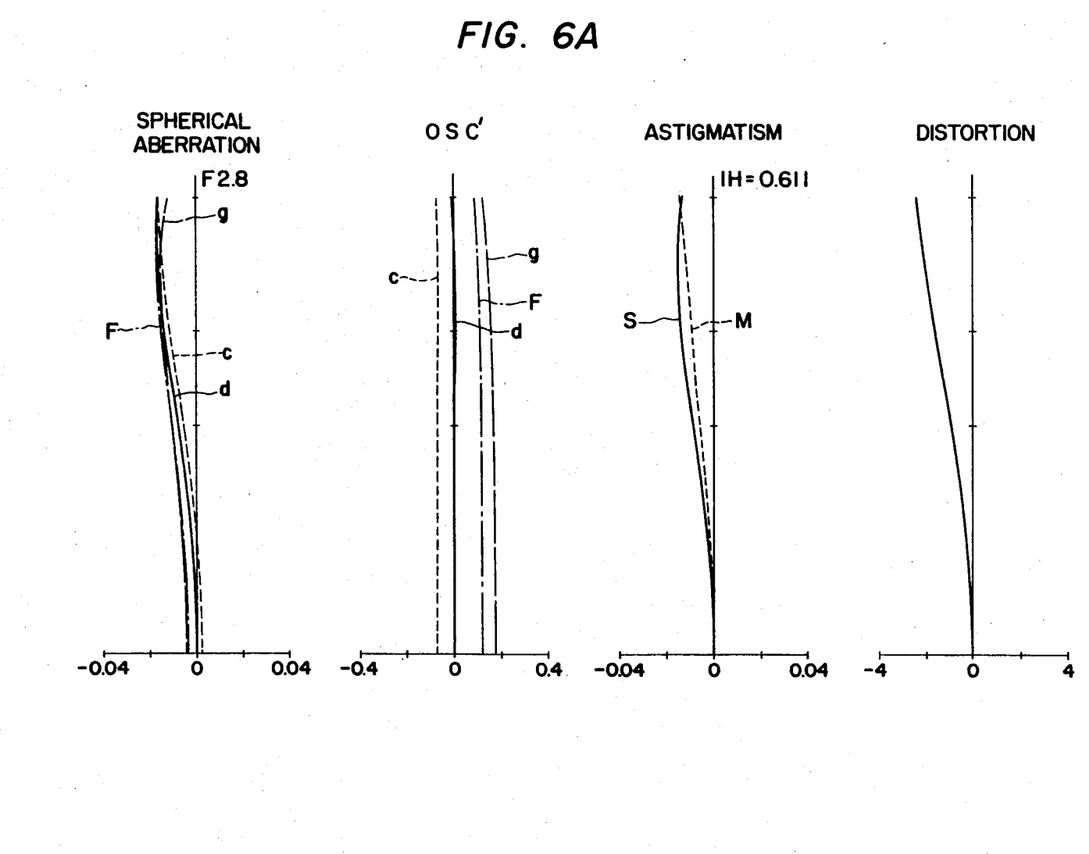
FIG. 6A and FIG. 6B show curves illustrating the aberration characteristics of the Embodiment 5 of the present invention.
Figure 6B:
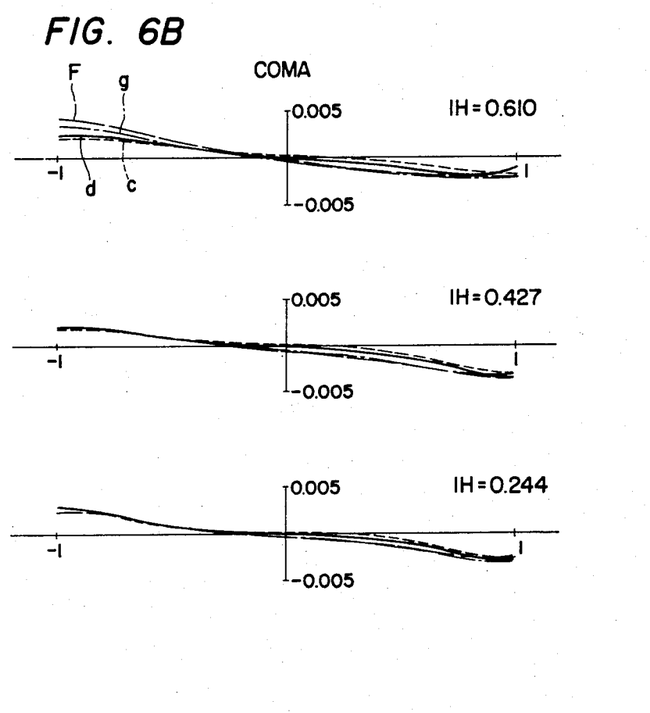

| f = 1 | | F/2.8 | | $\beta = -0.112X$ |
|---|---|---|---|---|
| $r_1 = 3.2586$ | | | | |
| | $d_1 = 0.1701$ | $n_1 = 1.51633$ | $\nu_1 = 64.15$ | |
| $r_2 = 0.8763$ | | | | |
| | $d_2 = 0.4454$ | | | |
| $r_3 = 0.7429$ | | | | |
| | $d_3 = 0.2531$ | $n_2 = 1.72000$ | $\nu_2 = 43.7$ | |
| $r_4 = -3.5722$ | | | | |
| | $d_4 = 0.1458$ | | | |
| $r_5 = -0.4965$ | | | | |
| | $d_5 = 0.0537$ | $n_3 = 1.74077$ | $\nu_3 = 27.79$ | |
| $r_6 = 1.7323$ | | | | |
| | $d_6 = 0.0287$ | | | |
| $r_7 = -3.3017$ | | | | |
| | $d_7 = 0.1539$ | $n_4 = 1.75500$ | $\nu_4 = 52.33$ | |
| $r_8 = -0.5374$ | | | | |
| | $d_8 = 0.0328$ | | | |
| $r_9 = 5.6263$ | | | | |
| | $d_9 = 0.1144$ | $n_5 = 1.75500$ | $\nu_5 = 52.33$ | |
| $r_{10} = -1.3686$ | | | | |
| | $d_{10} = 0.0775$ | | | |
| $r_{11} = 1.6475$ | | | | |
| | $d_{11} = 0.0871$ | $n_6 = 1.53172$ | $\nu_6 = 48.9$ | |
| $r_{12} = 1.1006$ | | | | |
| | $d_{12} = 0.9315$ | | | |
| $r_{13} = \infty$ | | | | |
| | $d_{13} = 0.0426$ | $n_7 = 1.51633$ | $\nu_7 = 64.15$ | |
| $r_{14} = \infty$ | | | | |
| $r_8/r_5 = 1.0824$ | | $d_5 + d_6 = 0.0824$ | | |
| $d_6 + d_7 = 0.1826$ | | $f_1 = -1.825$ | | | wherein the reference symbols $r_1$ through $r_{14}$ represent radii of curvature on the surfaces of the respective lens element, the reference symbols $d_1$ through $d_{13}$ designate thicknesses of the respective lens elements and the airspaces therebetween, the reference symbols $n_1$ through $n_7$ denote refractive indices of the respective lens elements and the reference symbols $\nu_1$ through $\nu_7$ represent Abbe's numbers of the respective lens elements. Among the above-described embodiments, the Embodiment 1 comprises cover glasses (traced in chain lines $P_1$ and $P_2$ respectively in the figure) arranged on the object side, for example, in front of a material to be photographed and on the image side, for example, in front of the sensor, and radii of curvature, thicknesses and other parameters of these cover glasses are represented by the reference symbols $r_0$, $r'_0$, $r_{13}$, $r_{14}$, $d_0$, $d'_0$, $d_{12}$, $d_{13}$, $n_0$, $\nu_0$, $n_7$ and $\nu_7$ respectively. In contrast, the Embodiment 2 does not use such a cover glass. In the Embodiment 3 through 5, a cover glass is arranged on the image side only, parameters of said cover glass being represented by the reference symbols $r_{13}$, $r_{14}$, $d_{12}$, $d_{13}$, $n_7$ and $\nu_7$ respectively. FIG. 2A and FIG. 2B shows curves illustrating the aberration characteristics of the Embodiment 1 wherein cover glasses are arranged on the object side and image side respectively. FIG. 3A and FIG. 3B show curves illustrating the aberration characteristics of the Embodiment 2 wherein no cover glass is arranged. Further, FIG. 4A, FIG. 4B; FIG. 5A, FIG. 5B; and FIG. 6A, FIG. 6B show curves illustrating the aberration characteristics of the Embodiment 3, Embodiment 4 and Embodiment 5 respectively wherein a cover glass is arranged only on the image side.

I claim:

1. A retrofocus type wide-angle lens system for use in micro readers, micro printers, facsimiles, etc. comprising a first negative meniscus lens component having a convex surface on the object side, a second positive lens component, a third biconcave lens component, a fourth positive lens component, a fifth positive lens component and a sixth negative meniscus lens component having a concave surface on the image side, and said lens system satisfying the following conditions:

(1) $-3.5f \leq f_1 \leq -1.2f$
(2) $0.85 \leq r_8/r_5 \leq 1.25$
(3) $0.06f \leq d_5 + d_6 \leq 0.12f$
(4) $0.12f \leq d_6 + d_7 \leq 0.24f$ wherein the reference symbol f represents focal length of the entire lens system as a whole, the reference symbol $f_1$ designates focal length of the first lens component, the reference symbols $r_5$ and $r_8$ denote radii of curvature on the object side surface of the third lens component and the image side surface of the fourth lens component respectively, the reference symbols $d_5$ and $d_7$ represent thicknesses of the third and fourth lens components respectively and the reference symbol $d_6$ designates the airspace between the third and fourth lens components.

2. A retrofocus type wide-angle lens system for use in micro readers, micro printers, facsimiles, etc. according to claim 1 having the following numerical data:

| f = 1 | | F/2.8 | | $\beta = -0.112X$ |
|---|---|---|---|---|
| $r_1 = 2.4516$ | | | | |
| | $d_1 = 0.1695$ | $n_1 = 1.51633$ | $\nu_1 = 64.15$ | |
| $r_2 = 0.8349$ | | | | |
| | $d_2 = 0.4442$ | | | |
| $r_3 = 0.7325$ | | | | |
| | $d_3 = 0.2530$ | $n_2 = 1.72000$ | $\nu_2 = 43.7$ | |
| $r_4 = -3.7637$ | | | | |
| | $d_4 = 0.1461$ | | | |
| $r_5 = -0.4965$ | | | | |
| | $d_5 = 0.0534$ | $n_3 = 1.74077$ | $\nu_3 = 27.79$ | |
| $r_6 = 1.6977$ | | | | |
| | $d_6 = 0.0284$ | | | |
| $r_7 = -3.1462$ | | | | |
| | $d_7 = 0.1536$ | $n_4 = 1.75500$ | $\nu_4 = 52.33$ | |
| $r_8 = -0.5251$ | | | | |
| | $d_8 = 0.0326$ | | | |
| $r_9 = 4.7802$ | | | | |
| | $d_9 = 0.1144$ | $n_5 = 1.75500$ | $\nu_5 = 52.33$ | |
| $r_{10} = -1.5031$ | | | | |
| | $d_{10} = 0.0776$ | | | |
| $r_{11} = 1.9016$ | | | | |
| | $d_{11} = 0.0868$ | $n_6 = 1.53172$ | $\nu_6 = 48.9$ | |
| $r_{12} = 1.2542$ | | | | |
| $r_8/r_5 = 1.0576$ | | $d_5 + d_6 = 0.0818$ | | |
| $d_6 + d_7 = 0.182$ | | $f_1 = -2.543$ | | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens elements.

3. A retrofocus type wide-angle lens system for use in micro readers, micro printers, facsimiles, etc. according to claim 1 having the following numerical data:

| $f = 1$ | | F/2.8 | $\beta = -0.112X$ |
|---|---|---|---|
| $r_1 = 1.7842$ | | | |
| | $d_1 = 0.1688$ | $n_1 = 1.51633$ | $v_1 = 64.15$ |
| $r_2 = 0.5967$ | | | |
| | $d_2 = 0.4389$ | | |
| $r_3 = 0.7535$ | | | |
| | $d_3 = 0.2534$ | $n_2 = 1.72000$ | $v_2 = 43.7$ |
| $r_4 = -2.5440$ | | | |
| | $d_4 = 0.1578$ | | |
| $r_5 = -0.5200$ | | | |
| | $d_5 = 0.0537$ | $n_3 = 1.74077$ | $v_3 = 27.79$ |
| $r_6 = 1.5175$ | | | |
| | $d_6 = 0.0292$ | | |
| $r_7 = -6.0605$ | | | |
| | $d_7 = 0.1405$ | $n_4 = 1.75500$ | $v_4 = 52.33$ |
| $r_8 = -0.5356$ | | | |
| | $d_8 = 0.0335$ | | |
| $r_9 = -6.7837$ | | | |
| | $d_9 = 0.1153$ | $n_5 = 1.75500$ | $v_5 = 52.33$ |
| $r_{10} = -1.2390$ | | | |
| | $d_{10} = 0.0798$ | | |
| $r_{11} = 1.8230$ | | | |
| | $d_{11} = 0.0944$ | $n_6 = 1.77250$ | $v_6 = 49.6$ |
| $r_{12} = 1.6576$ | | | |
| $r_8/r_5 = 1.03$ | | $d_5 + d_6 = 0.0829$ | |
| $d_6 + d_7 = 0.1697$ | | $f_1 = -2.379$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_6$ denote refractive indices of the respective lens elements and the reference symbols $v_1$ through $v_6$ represent Abbe's numbers of the respective lens elements.

4. A retrofocus type wide-angle lens system for use in micro readers, micro printers, facsimiles, etc. according to claim 1 having the following numerical data:

| $f = 1$ | | F/2.8 | $\beta = -0.112X$ |
|---|---|---|---|
| $r_1 = 1.8926$ | | | |
| | $d_1 = 0.1693$ | $n_1 = 1.51633$ | $v_1 = 64.15$ |
| $r_2 = 0.7632$ | | | |
| | $d_2 = 0.4423$ | | |
| $r_3 = 0.7420$ | | | |
| | $d_3 = 0.2531$ | $n_2 = 1.72000$ | $v_2 = 43.7$ |
| $r_4 = -3.7573$ | | | |
| | $d_4 = 0.1484$ | | |
| $r_5 = -0.4938$ | | | |
| | $d_5 = 0.0537$ | $n_3 = 1.74077$ | $v_3 = 27.79$ |
| $r_6 = 1.7639$ | | | |
| | $d_6 = 0.0288$ | | |
| $r_7 = -3.1687$ | | | |
| | $d_7 = 0.1399$ | $n_4 = 1.75500$ | $v_4 = 52.33$ |
| $r_8 = -0.5128$ | | | |
| | $d_8 = 0.0330$ | | |
| $r_9 = 9.9423$ | | | |
| | $d_9 = 0.1146$ | $n_5 = 1.75500$ | $v_5 = 52.33$ |
| $r_{10} = -1.4353$ | | | |
| | $d_{10} = 0.0775$ | | |
| $r_{11} = 2.3422$ | | | |
| | $d_{11} = 0.0855$ | $n_6 = 1.53172$ | $v_6 = 48.9$ |
| $r_{12} = 1.7397$ | | | |
| $r_8/r_5 = 1.0385$ | | $d_5 + d_6 = 0.0825$ | |
| $d_6 + d_7 = 0.1687$ | | $f_1 = -2.532$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_6$ denote refractive indices of the respective lens elements and the reference symbols $v_1$ through $v_6$ represent Abbe's numbers of the respective lens elements.

5. A retrofocus type wide-angle lens system for used in micro readers, micro printers, facsimiles, etc. according to claim 1 having the following numerical data:

| $f = 1$ | | F/2.8 | $\beta = -0.112X$ |
|---|---|---|---|
| $r_1 = 2.4578$ | | | |
| | $d_1 = 0.1697$ | $n_1 = 1.51633$ | $v_1 = 64.15$ |
| $r_2 = 0.8333$ | | | |
| | $d_2 = 0.4441$ | | |
| $r_3 = 0.7328$ | | | |
| | $d_3 = 0.2532$ | $n_2 = 1.72000$ | $v_2 = 43.7$ |
| $r_4 = -3.7826$ | | | |
| | $d_4 = 0.1466$ | | |
| $r_5 = -0.4970$ | | | |
| | $d_5 = 0.0536$ | $n_3 = 1.74077$ | $v_3 = 27.79$ |
| $r_6 = 1.6987$ | | | |
| | $d_6 = 0.0288$ | | |
| $r_7 = -3.1388$ | | | |
| | $d_7 = 0.1540$ | $n_4 = 1.75500$ | $v_4 = 52.33$ |
| $r_8 = -0.5253$ | | | |
| | $d_8 = 0.0329$ | | |
| $r_9 = 4.8094$ | | | |
| | $d_9 = 0.1143$ | $n_5 = 1.75500$ | $v_5 = 52.33$ |
| $r_{10} = -1.4993$ | | | |
| | $d_{10} = 0.0774$ | | |
| $r_{11} = 1.8969$ | | | |
| | $d_{11} = 0.0869$ | $n_6 = 1.53172$ | $v_6 = 48.9$ |
| $r_{12} = 1.2516$ | | | |
| $r_8/r_5 = 1.0569$ | | $d_5 + d_6 = 0.0824$ | |
| $d_6 + d_7 = 0.1828$ | | $f_1 = -2.610$ | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_6$ denote refractive indices of the respective lens elements and the reference symbols $v_1$ through $v_6$ represent Abbe's numbers of the respective lens elements.

6. A retrofocus type wide-angle lens system for use in micro readers, micro printers, facsimiles, etc. according to claim 1 having the following numerical data:

| $f = 1$ | | F/2.8 | $\beta = -0.112X$ |
|---|---|---|---|
| $r_1 = 3.2586$ | | | |
| | $d_1 = 0.1701$ | $n_1 = 1.51633$ | $v_1 = 64.15$ |
| $r_2 = 0.8763$ | | | |
| | $d_2 = 0.4454$ | | |
| $r_3 = 0.7429$ | | | |
| | $d_3 = 0.2531$ | $n_2 = 1.72000$ | $v_2 = 43.7$ |
| $r_4 = -3.5722$ | | | |
| | $d_4 = 0.1458$ | | |
| $r_5 = -0.4965$ | | | |
| | $d_5 = 0.0537$ | $n_3 = 1.74077$ | $v_3 = 27.79$ |
| $r_6 = 1.7323$ | | | |
| | $d_6 = 0.0287$ | | |
| $r_7 = -3.3017$ | | | |
| | $d_7 = 0.1539$ | $n_4 = 1.75500$ | $v_4 = 52.33$ |
| $r_8 = -0.5374$ | | | |
| | $d_8 = 0.0328$ | | |
| $r_9 = 5.6263$ | | | |
| | $d_9 = 0.1144$ | $n_5 = 1.75500$ | $v_5 = 52.33$ |
| $r_{10} = -1.3686$ | | | |
| | $d_{10} = 0.0775$ | | |
| $r_{11} = 1.6475$ | | | |
| | $d_{11} = 0.0871$ | $n_6 = 1.53172$ | $v_6 = 48.9$ |
| $r_{12} = 1.1006$ | | | |
| $r_8/r_5 = 1.0824$ | | $d_5 + d_6 = 0.0824$ | |

-continued

| $f = 1$ | F/2.8 | $\beta = -0.112X$ |
|---|---|---|
| $d_6 + d_7 = 0.1826$ | | $f_1 = -1.825$ | wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens elements.

* * * * *